United States Patent [19]

Beekman

[11] Patent Number: 4,773,685
[45] Date of Patent: Sep. 27, 1988

[54] BUMPER

[75] Inventor: Arie W. Beekman, Schinnen, Netherlands

[73] Assignee: Stamicarbon B.V., Geleen, Netherlands

[21] Appl. No.: 4,499

[22] Filed: Jan. 20, 1987

[30] Foreign Application Priority Data

Jan. 20, 1986 [NL] Netherlands ............. 8600097

[51] Int. Cl.⁴ .............................. B60R 19/18
[52] U.S. Cl. .................... 293/122; 293/136; 293/155
[58] Field of Search .......... 293/110, 120, 122, 132, 293/136, 155

[56] References Cited

U.S. PATENT DOCUMENTS

| 3,901,543 | 8/1975 | Norlin | 293/122 |
| 4,029,350 | 6/1977 | Goupy et al. | 293/110 |
| 4,050,689 | 9/1977 | Barton et al. | 293/110 |
| 4,533,166 | 8/1985 | Stokes | 293/120 |
| 4,652,036 | 3/1987 | Okamoto et al. | 293/120 X |
| 4,658,941 | 4/1987 | Gottwald et al. | 293/120 X |

FOREIGN PATENT DOCUMENTS

| 1059554 | 7/1979 | Canada | 293/120 |
| 0170335 | 7/1985 | European Pat. Off. | |
| 2364789 | 5/1978 | France | 293/136 |
| 2708856 | 10/1977 | Fed. Rep. of Germany | 293/122 |

Primary Examiner—Dennis H. Pedder
Attorney, Agent, or Firm—Cushman, Darby & Cushman

[57] ABSTRACT

Bumper comprising an elongated hollow plastic shape, of which one longitudinal wall presents a contact face and the wall opposite this presents a base, the hollow interior being provided with tubular stiffening bodies at right angles to the base, at one end attached to the base, some of these being additionally attached to the contact face wall at another end by a flexible plate element and a projection extending therefrom. The flexible plate element and projection compensate for dimensional variation in the stiffening bodies.

The bumper can be used for example in motorcars, ships and on quay walls.

2 Claims, 1 Drawing Sheet

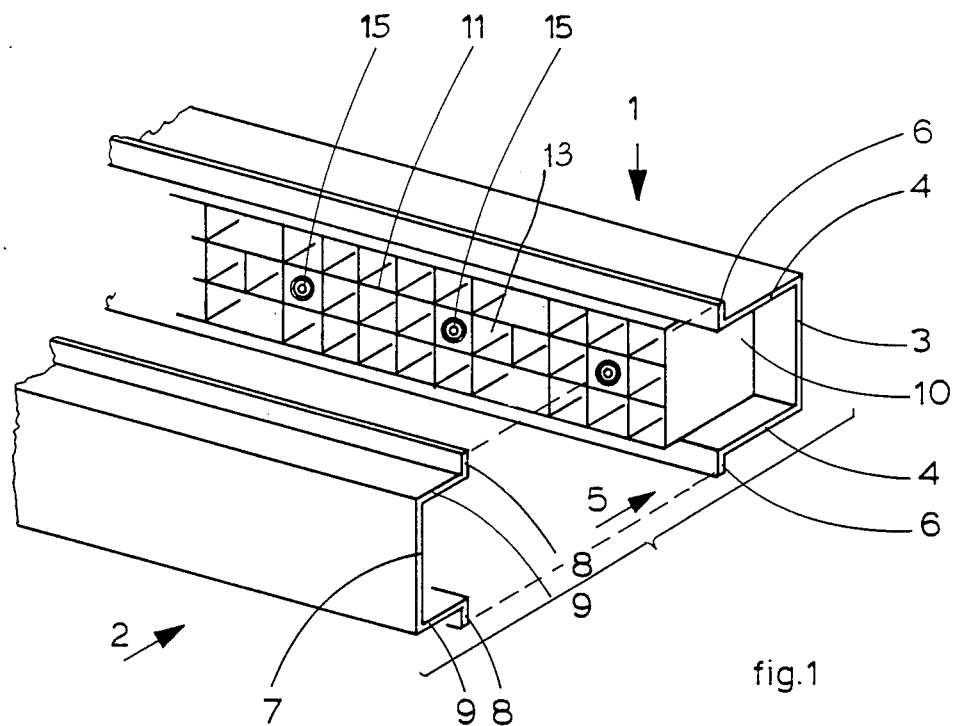
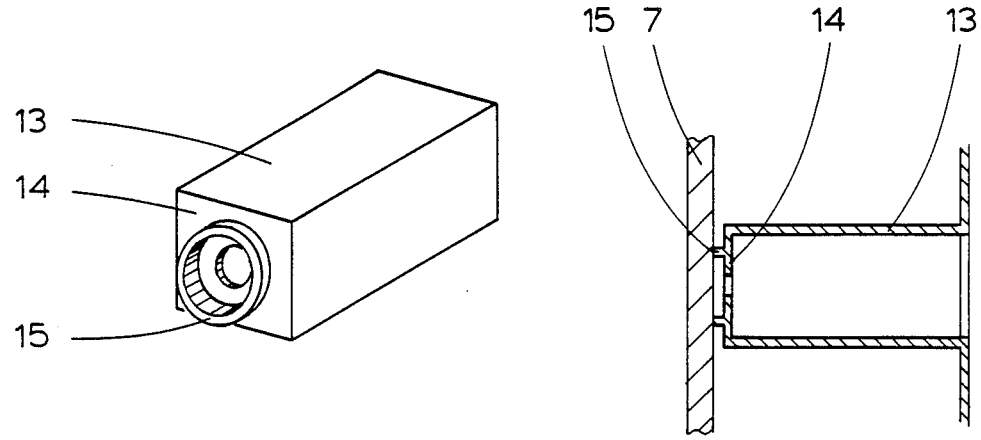
fig. 1
fig. 2
fig. 3

BUMPER

The invention relates to a bumper comprising an elongated hollow plastic shape, of which one longitudinal wall presents a contact face and the wall opposite this presents a base, the hollow interior being provided with a number of stiffening elements at right angles to the base.

Bumpers, or similar devices, are used for example in motorcars, ships, or quay walls and in other applications to absorb shock or impact loads.

Such a bumper is known from the published European Pat. No. 170.335. The known bumper consists of an elongated hollow shape, the inside wall of which is provided with stiffening elements in the form of continuous ribs set at regular intervals and each lying in a plane substantially perpendicular to the longitudinal axis of the bumper.

The disadvantage of the known bumper is that the stiffening elements (ribs), which, compared with the thickness of the contact face wall, are relatively thick, produce so-called shrinkage cavities on the contact face. Designers, for instance of motorcars, consider this a drawback for the aesthetics of the produce to which such a bumper is attached.

The aim of the invention is to provide a bumper that does not or hardly present the mentioned disadvantage.

The bumper according to the invention is characterized in that the stiffening elements consist of tubular bodies, at one end attached to the base (hereinafter to be referred to as type A), some of these, with a substantially equal spacing along the shape, being additionally attached to the contact face wall (hereinafter to be referred to as type B). The term tubular is in this context also understood to mean slightly tapering. The advantage of the bumper according to the invention is that the contact face wall does not present shrinkage cavities and is yet so attached to the stiffening elements in the hollow shape as to substantially contribute to the stiffness of the bumper assembly so that under load the assembly does not fold or buckle until a late stage of the loading when the load has become comparatively large. The stiffening elements may be injection moulded integral with the base or attached to it by means of a welded, clicked or riveted joint. The latter types of joints may also be applied to connect the stiffening elements to the contact face wall.

It is not essential for the stiffening elements to be interconnected. However, this does offer the advantage of enhancing their form-retaining quality.

One embodiment of the invention is characterized in that the attachment of type B to the contact face wall is flexible in the longitudinal direction of the stiffening element. The advantage of this is that any dimensional variations, for example resulting from longitudinal shrinkage differences in injection moulding of the stiffening elements, are compensated for by the flexible attachment so that the appearance of the contact face is not affected. Obviously the flexibility of the joint must be considerably greater than the local deformability of the contact face wall. Considerably is in this context understood to be one order to magnitude. The flexible attachement could, for example, be realized by a flexible plate element, which, on one side, is attached to the end of the stiffening element and, on the other, to the contact face wall.

One embodiment of the invention is characterized in that the plate element is provided with at least one projection made of thermoplastic material toward the contact face wall. The location of the projection on the plate element shall be so chosen as to allow some room for movement at the back of the element, on the spot of the projection. The purpose of this projection is to ensure a good weld to the contact face wall.

The cross sectional shape of the stiffening elements is in itself not essential with respect to the invention. Hollow stiffening elements with a polygonal cross section are preferred. This is meant to include a circular cross section. The flexible joint between one end of such stiffening elements and the contact face wall can be easily realized by closing the relative end of the stiffening element by means of a thin, flexible plate. Tubular elements, arranged perpendicularly to the base of the bumper, are known as such from the U.S. Pat. No. 4,029,350. This patent specification concerns a bumper incorporating a metal support. The purpose of the plastic tubular elements is not to stiffen the bumper, but to deform plastically under impact load.

A circular thickening ('ridge'), for example, or a number of hemispherical projections could be applied to the side of the flexible plate facing the contact face wall. This can be readily done by injection moulding.

One embodiment of the invention shall be elucidated hereafter by means of a few figures, without, however, being limited thereto.

Shown in the figures are
in FIG. 1 a perspective view of the bumper with the front half removed,
in FIG. 2 is a detail of a stiffening element and in FIG. 3 a detail of the joint between a stiffening element and the contact face wall.

In the FIG. 1 is, seen in travelling direction, the back half and 2 the front half of the hollow shape. The back half 1 consists of a base 3 and sides 4; welding ridges 6 have been applied near the free ends 5. The front half 2 consists of a contact face 7 and of sides 9, also provided with welding ridges 8. In most embodiments contact face 7 will not be flat, as drawn here, but curved longitudinally as well as transversely.

The interior 10, consisting of a number of interconnected stiffening elements, is obviously shaped such as to practically fit the interior of the front half 2 and contact face wall 7 in particular.

Back half 1 and interior 10 can be injection moulded integrally from a thermoplastic material such as rubber modified polypropylene or a polypropylene copolymer. Front half 2 can also be injection moulded, for example, though not necessarily, from the same material as the back half.

Interior 11 preferably projects slightly, a few millimeters, above sides 4 of the back half 1, thus forming a rim on which the front half 2 can be positioned. The two halves may be welded together, preferably by means of hot-plate sealing or butt welding. A riveted or clicked connection may also be made. The typical organs required for this purpose have not been indicated, but these are known in the art.

Interior 10 consists of a number of tubular stiffening elements 13 (shown once only), interconnected by ribs 11 (shown once only) which may form part of other adjacent stiffening elements. Stiffening elements other than tubular elements may be used, such as two intersecting planes with a cross-shaped transverse section (not shown).

In some places contact face wall 2 is flexibly connected to interior 10. Some of the ends of stiffening elements 13 facing the contact face wall are for this purpose closed by means of flexible plate elements 14. In addition to this, and of particular importance with respect to compensating for dimensional variations, a 'welding ridge' 15 may be applied to the outside of the plate element.

EXAMPLE (TEST A)

A bumper with a hollow shape and a rectangular cross section of a plastic with a modulus of elasticity of 1200 N/mm$^2$ has a wall thickness of 3.6 mm. The exterior dimensions are 80 mm×150 mm. The wall thickness of the tubes present is 2 mm. The dimensions of the cross section of the tubular elements are 40×40 mm and there are 35 tubular elements per 1000 mm along the length of the shape, 7 of which are attached to the contact face wall. The bumper is attached to two points of suspension situated 1000 mm apart on a horizontally placed, freely moving, wagon with a mass of 1000 kg. The base, the high side, of the bumper is vertical. A shock applied between the points of suspension at a rate of 4 km/h of the movable wagon appear as to cause the bumper to bend 55 mm.

COMPARATIVE EXAMPLE (TEST B)

A test similar to A is carried out with a bumper made of the same plastic, with the same exterior dimensions and with the same mass.

The hollow interior has been provided with continuous ribs all around with a thickness of 4 mm and a height of 16 mm. The ribs are set at intervals of 50 mm. The contact face clearly shows shrinkage cavities.

A shock between the points of suspension applied at a rate of 4 km/h of the movable wagon appears to cause the bumper to bend 60 mm.

It is remarkable that, despite of the contact face wall of the bumper according to the invention being attached to the interior of the bumper in a few places only, the preformance is better.

I claim:

1. A bumper comprising:
   an elongated hollow plastic shape having first and second opposite walls, of which one wall is a contact face and a second wall opposite thereto presents a base, the hollow interior of said shape being provided with a number of stiffening elements at right angles to said base, wherein said stiffening elements comprise tubular elements, at one end attached to said base and at the opposite end thereof, some of said stiffening elements, with a substantially equal spacing along said shape having a flexible plate element attached to an end adjoining said contact face and being additionally attached to an inner surface of said contact face wall by a projection extending between said flexible plate element and said contact face whereby the attachment to said contact face by means of said flexible plate element and projection compensates for dimensional variations in said stiffening elements.

2. A bumper according to claim 1, wherein:
   said tubular stiffening elements have polygonal cross sections.

* * * * *